Sept. 20, 1949.    E. F. HARACZ    2,482,480
OPTICAL PROJECTION SYSTEM FOR PROJECTING
TOOL AND CUTTER PROFILES
Filed June 28, 1946    3 Sheets-Sheet 1

INVENTOR
EDWARD F. HARACZ
BY
ATTORNEY

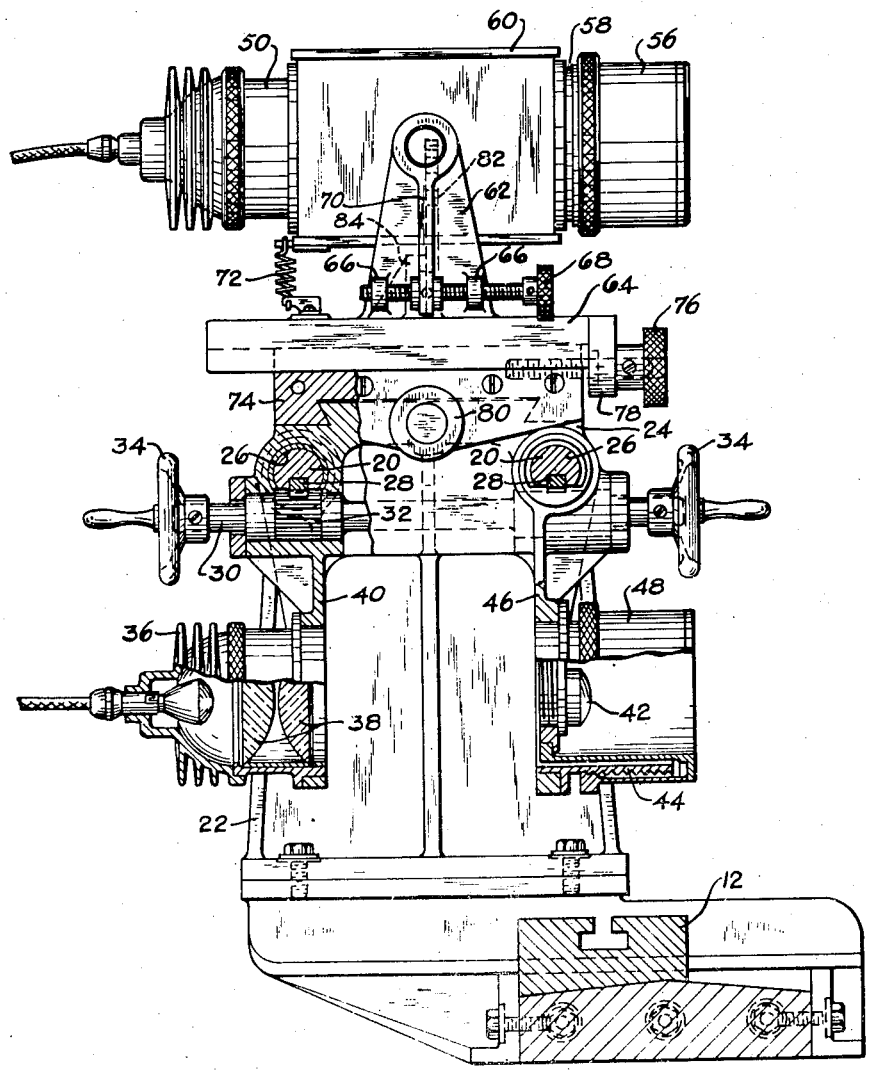

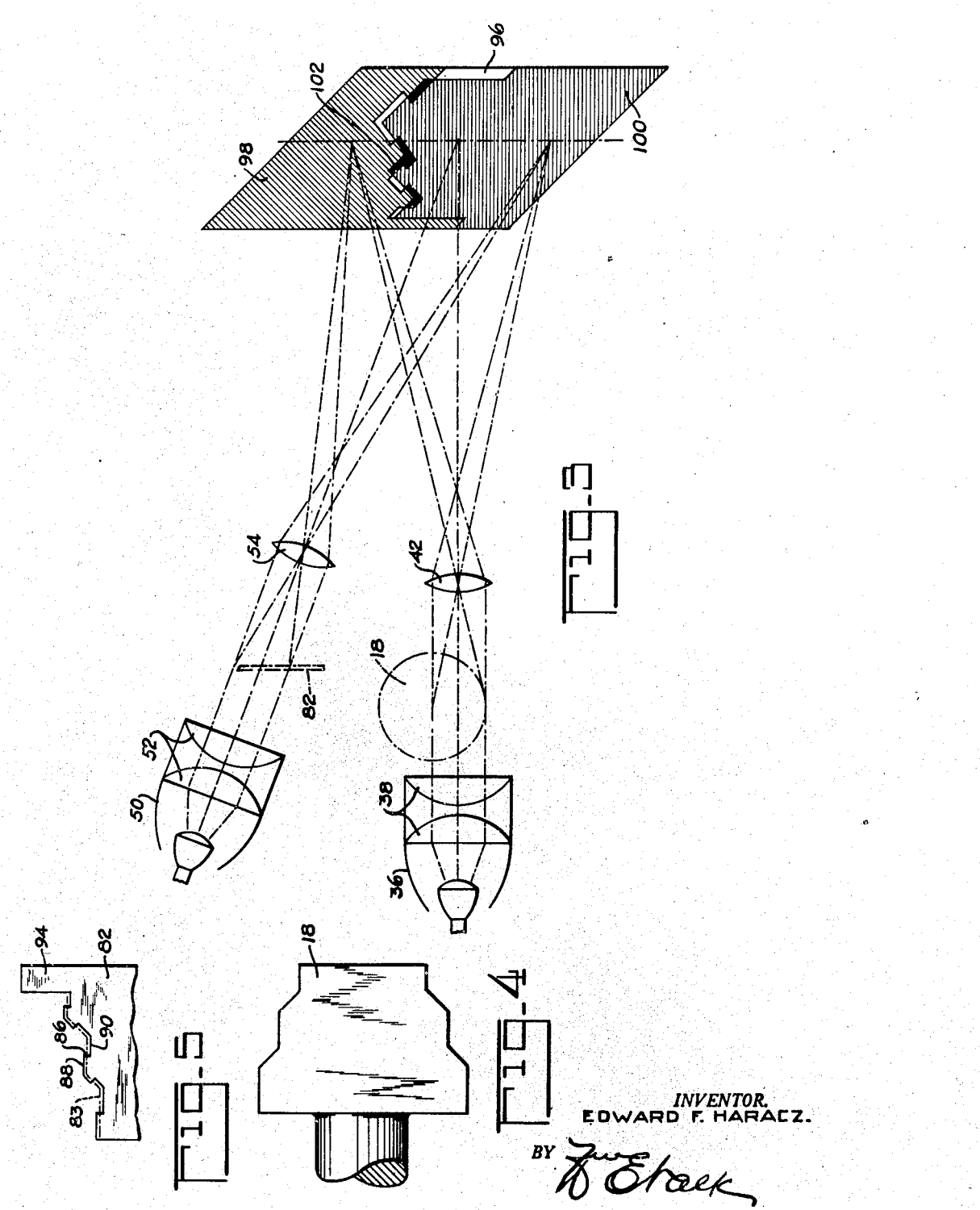

Patented Sept. 20, 1949

2,482,480

UNITED STATES PATENT OFFICE 2,482,480

OPTICAL PROJECTION SYSTEM FOR PROJECTING TOOL AND CUTTER PROFILES

Edward F. Haracz, Clifton, N. J., assignor to Wright Aeronautical Corporation, a corporation of New York Application June 28, 1946, Serial No. 680,137

4 Claims. (Cl. 88—24)

1

This invention relates to means for checking the profile of cutting tools and other devices and is particularly directed to a new and improved optical projection system for checking profiles.

The invention, although of general application, is illustrated and described in connection with a cutter and tool grinding machine. It is an object of this invention to provide an optical projection system for checking the tool or cutter profiles, which system is so constructed that the profile of the cutter or tool may be checked without removing the cutter or tool from the grinding machine. A further object of this invention is to provide an optical projection system for checking tool or cutter profiles and which may be adjusted for any desired magnification of the profile to be checked, and in which large tool or cutter profiles may be completely checked in one operation regardless of the degree of magnification. It is a further object of this invention to provide an optical system for checking the profile of a tool or cutter in which the profile of the tool or cutter is compared with the profile of a fullsized template. In addition, it is an object of this invention to provide means for checking the profile of a tool or cutter by projecting a shadowimage of this profile and comparing this projected shadow-image with that of a template having the desired profile.

Specifically the invention comprises two relatively adjustable light projectors, one of which is arranged for projecting a shadow-image of the profile of a tool or cutter to be checked, and the other projector is arranged to project a shadowimage of the profile of a template having a desired tool or cutter profile. With this construction, by projecting the shadow-image of the template and tool or cutter profile, a quick visual check can be made of the profile of the tool or cutter with that of the template.

Other objects of this invention will become apparent upon reading the annexed detailed description in connection with the drawing in which:

Figure 2 is a view partly in section taken primarily along line 2—2 of Figure 1;

Figure 3 is a schematic view of the optical system;

Figure 4 is an elevational view of the profile of a typical cutter; and

Figure 5 is an elevational view of a template having a desired cutter profile.

2

Figure 1:
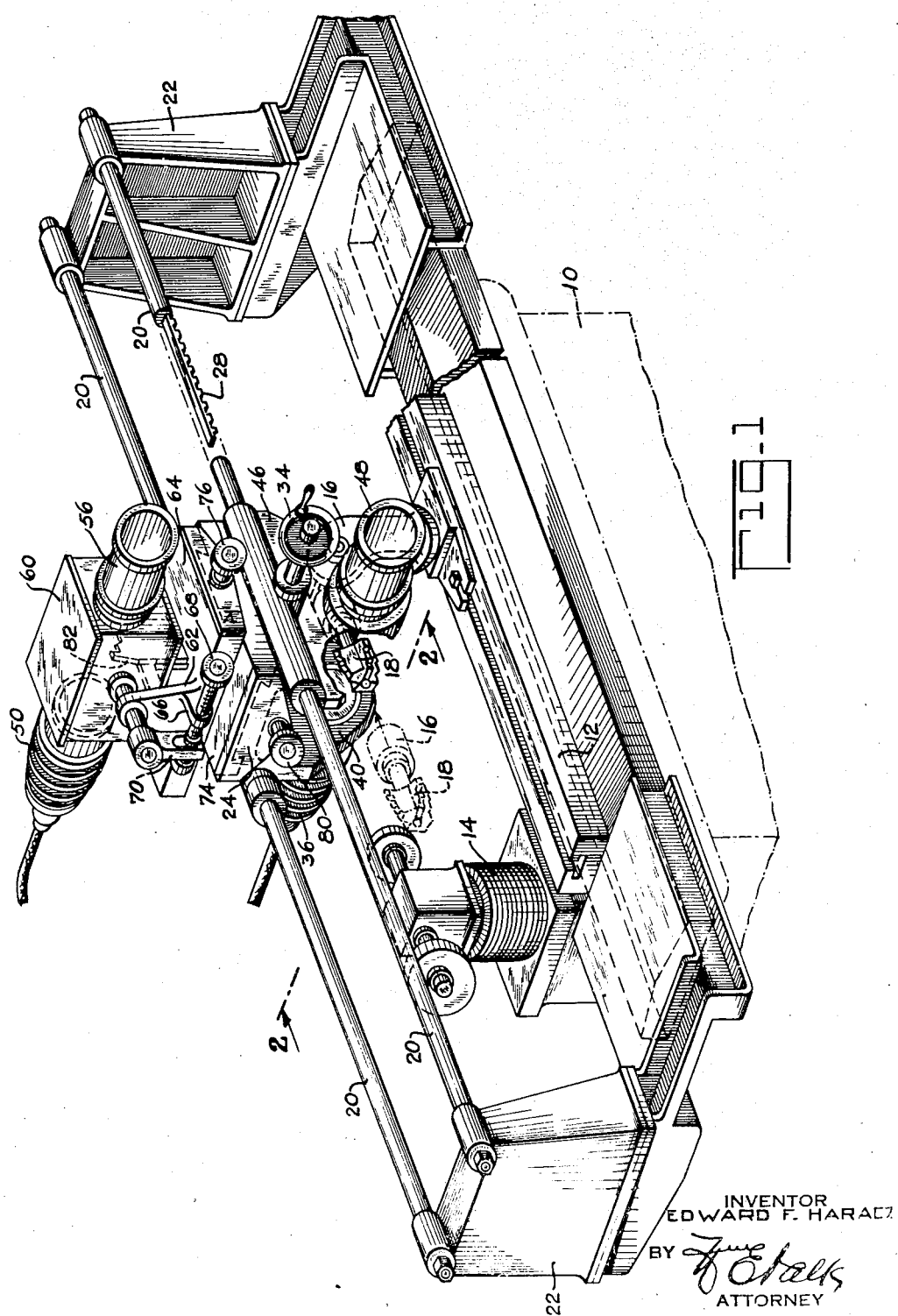
Figure 1 is a perspective view illustrating the invention applied to a cutter and tool grinding machine.

Referring first to Figs. 1 and 2, a conventional tool and cutter grinding machine 10 is illustrated in dot-dash outline and comprises a movable work table 12 and adjustable grinding wheel head 14 and a work supporting head 16 which is adjustable along the table 12. A cutter 18 carried by the work supporting head 16 is illustrated in dotdash outline in Figure 1 in position for grinding, and after the grinding operation, the work supporting head 16 is moved with the table 12 to the full line position of the cutter 18 where the profile of the cutter may be quickly checked by the apparatus hereinafter described without removing the cutter from the grinding machine. This is particularly important in case of carbide-tipped cutters in which the carbide cutter surface may chip upon coming into contact with another metallic surface.

In order to check the profile of the cutter 18, upper and lower light projectors are supported by parallel rods 20 carried by supporting brackets 22 which in turn are secured to the table 12 for movement therewith. The support for the light projectors comprises a main frame 24 which includes a pair of spaced parallel bores 26 through which the rods 20 extend for supporting the frame 24 for movement therealong. Each of the rods 20 is provided with a rack 28 along its under side, and a shaft 30 journaled within the main frame 24 carries a pair of pinions 32 in engagement with the racks 28. With this construction, operation of the hand wheel 34 on the shaft 30 rotates the pinions 32 thereby moving the frame 24 along the rods 20. Thus the projectors may be readily moved to any desired position over the work table for checking the profile of a cutter or tool, and may be readily moved to one end of the supporting rods 20 so as not to interfere with the grinding operations.

The lower light projector comprises a lamp housing 36 with a condensing lens assembly 38 which is fixedly supported from the main frame 24 below and behind the rear rod 20 as seen in Figure 1, by a web 40 depending from the main frame 24. A focusing and image-projecting lens 42 is supported from the main frame 24 in axial alignment with and spaced from the lamp housing 36 by an externally threaded sleeve 44 carried by a web 46 depending from the main frame 24. The spacing and disposition of the lamp housing and the lens 42 are such as to permit movement of the lower light projector and/or the work supporting head to bring the cutter 18 between the lamp housing 36 and the lens 42, as illustrated in Figure 1, whereby a shadow-image of the profile of the cutter may be projected on a screen. The focusing and image-projecting lens 42 is carried by a lens barrel 48 threaded on the sleeve 44 for adjustment therealong in order to obtain a sharp shadow outline of the cutter.

The upper projector is similar to the lower projector and comprises a lamp housing 50 with a condensing lens assembly 52 and a focusing and image-projecting lens 54 adjustably carried by the lens barrel 56 on a sleeve 58. A housing 60 rigidly interconnects the lamp housing 50 with the sleeve 58 to complete the upper projector unit. The upper projector unit is pivotally supported between upstanding gears 62 on an upper slide frame 64. In order to effect pivotal adjustment of the upper projector, one of the ears 62 is provided with a pair of projecting lugs 66 through which a bolt 68 is threaded. The bolt 68 is interconnected with an arm 70, depending from the lamp housing 60, whereby the lamp housing may be pivotally adjusted by threaded adjustment of the bolt 68. A spring 72 is operative to take up the lost motion in the pivotal adjusting means for the upper projector.

The upper slide frame 64 is provided with a dove tail connection with an intermediate slide frame 74 for sliding adjustment of the frame 64 transversely of the rods 20. An adjusting screw 76 carried by a depending flange 78 on the upper slide frame is threaded into the intermediate slide frame, whereby the upper projector may be adjusted transversely of the rods 20 by the screw 76. The intermediate slide frame 74 is provided with a dove tail connection with the main frame 24 permitting adjustment of the intermediate frame 74 along the rods 20 relative to the main frame 24. A screw 80 is arranged similar to the screw 76 for effecting this latter adjustment.

A template 82 having a fullsize profile corresponding to the desired cutter profile is arranged to be secured to a flange 84 on the upper slide frame 74 and to extend therefrom into the projector housing 60 into the path of the light rays. Thus the profile of the template 82 may be projected on a screen as a shadow-image for comparison with the shadow-image of the cutter.

With the structure so far described the lower projector is fixedly carried by the main frame 24 which is slidable along the supporting rods 20. The upper projector is also carried by the main frame 24, but the slide frames 64 and 74 permit adjustment of the upper projector along and transversely of the supporting rods 20 relative to the lower projector. In addition the upper projector is mounted on the upper slide frame 64 for pivotal adjustment relative to the lower projector about an axis transverse to its optical axis, that is, about an axis parallel to the supporting rods 20. This relative adjustment of the upper and lower projectors permits the shadow-images of the cutter and template to be disposed in side-by-side relation, thereby facilitating comparison of the cutter profile with the template. The optical system of the projectors is hereinafter described and is illustrated in Figure 3.

Before the above described apparatus is used for checking the profile of a cutter, the upper and lower projectors preferably are first synchronized to project sharp shadow images of equal magnification on a projection screen. The projectors can be synchronized by a pair of templates having mating profiles. One of said pair of templates is supported on the mounting flange 84 of the upper projector and the other template is supported on the head 16 in place of the cutter whose profile is to be checked so as to occupy the same position along the optical axis of the lower projector relative to the projection lens 42 as said cutter. Said pair of templates have mating or complementary profiles, e. g., the one template may have a profile similar to the mean profile 83 of the template 82 as illustrated in Figure 5, while the other of said pair of templates has a mating or complementary profile like the profile of the lower edge of the cutter 18 illustrated in Figure 4. The shadow outlines of each of said pair of templates is projected on the screen and the relative magnification and orientation of the projectors are adjusted until the projected shadow outline of one template completely fills the otherwise bright portion on the screen adjacent the shadow outline of the other template. The two projectors are then synchronized, that is, they are adjusted for equal magnification and are properly oriented.

The operator is then ready to grind the tool or cutter, and after grinding the tool or cutter, a template having the desired cutter tool profile is mounted in the upper projector on the flange 84. A shadow-image of the profile of the cutter and template is projected on the screen, and since the projectors are in synchronism as above described, the operator can see at a glance whether further grinding is necessary and where. After further grinding, the cutter or tool profile is again moved with the work table into position within the lower projector, and its shadow-image is again compared with that of the template. This is repeated until the desired tool or cutter profile is obtained. At this point it should be noted that instead of using a pair of templates for synchronizing the projectors as above described, the cutter and its template may be used directly for this purpose.

Figure 3 illustrates the optical system of the two projectors for comparing the profile of the schematically indicated cutter 18 with that of a template 82. The cutter profile and template profile are illustrated in Figures 4 and 5 respectively. The template has a mean profile 83 and each section of the profile of the template is provided with high and low limit portions, e. g., the template section 86 is provided with a high limit portion 88 and a low limit portion 90, and the mean template profile is indicated by the dot-dash line 83. Obviously, for most applications, the magnitude of the tolerance between the high and low limits indicated by the template is greatly exaggerated in Figure 5. The template 82 is also provided with an end portion 94 to facilitate alignment of the template with the end of the cutter. Going back to Figure 3, the dot-dash lines illustrate the paths of various possible rays of light to the screen 96 in the absence of the template and cutter. The template and cutter intercept these rays of light and respectively throw shadows 98 and 100 on the screen with the projection lenses 42 and 54 respectively projecting a sharp shadow image of the profile of the cutter and template. As illustrated, inspection of the projection screen 96 quickly reveals that all portions of the cutter are within the high and low limits indicated by the template with the exception of the cutter profile edge portion 102. Accordingly, the operator can immediately tell that the cutter edge portion 102 is high and must be ground further.

With the above construction, the profile of a cutter or tool or other object may be quickly checked, and in the case of a tool or cutter without removing the cutter or tool from the grinding machine, by comparing the projected shadow-images of the profile of the cutter or tool with that of the template. Also, the profile of the cutter or tool may be magnified to any desired practical extent merely by suitably locating the projection screen and its shadow-image may then be compared to a similarly magnified shadow-image of a template.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. Apparatus for checking the profile of an object in which said profile comprises a series of individual line portions, said apparatus comprising a first projector arranged to project a shadow-image of the contour of said object, a template of sheet material having a series of edge portions corresponding to the desired profile of said object, each of said template edge portions being divided into a high limit section and a low limit section thereby indicating the range of tolerance of the corresponding profile portion of said object, a second projector arranged to project a shadow-image of the profile of said template adjacent to said first mentioned shadow-image, and means for adjusting the position and orientation of the two projectors relative to each other so that their respective shadow images are of equal magnification and are disposed in side-by-side relation whereby the profile of said object may be quickly checked against the tolerance limits of said template.

2. In combination with a machine tool for machining a work piece and having a work supporting table and a work supporting head thereon, a member disposed above said table and carried thereby, a pair of projectors, means for supporting said projectors on said member for simultaneous movement therealong above said table, one of said projectors being adapted to project a magnified shadow-image of the profile of a work piece while said work piece is supported by said head, a template movable with said other projector and having the desired work piece profile, said other projector being arranged to project a similarly magnified shadow-image of the profile of said template, and means for adjusting the position and orientation of the two projectors relative to each other so that their respective shadow images are of equal magnification and are disposed in side-by-side relation.

3. In combination with a machine tool for machining a work piece and having a work supporting table and a work supporting head thereon, a member disposed above said table and carried thereby, a pair of projectors, means for supporting said projectors on said member for movement along and above said table, one of said projectors being adapted to project a magnified shadow-image of the profile of a work piece while said work piece is supported by said head, a template movable with said other projector and having the desired work piece profile, said other projector being arranged to project a similarly magnified shadow-image of the profile of said template, means for effecting translational movement of one of said projectors in two horizontal directions relative to the other projector, and means for effecting angular movement of one of said projectors in a vertical plane relative to the other projector.

4. In the combination recited in claim 3 in which said template has a series of edge portions corresponding to the desired profile of said work piece with each said edge portion divided into a high limit section and a low limit section thereby indicating the range of tolerance of the corresponding portion of the profile of the work piece.

EDWARD F. HARACZ.

REFERENCES CITED

The following references are of record in the file of this patent:

UNITED STATES PATENTS

| Number | Name | Date |
| --- | --- | --- |
| 595,541 | Hollen | Dec. 14, 1897 |
| 1,480,390 | Hartness | Jan. 8, 1924 |
| 2,035,780 | Beardsley et al. | Mar. 31, 1936 |
| 2,155,248 | Adams et al. | Apr. 18, 1939 |
| 2,179,799 | Phillips | Nov. 14, 1939 |
| 2,192,529 | Thomas et al. | Mar. 5, 1940 |
| 2,360,772 | Hedin | Oct. 17, 1944 |
| 2,365,613 | Wibmer et al. | Dec. 19, 1944 |
| 2,372,470 | Bergstrom et al. | Mar. 27, 1945 |
| 2,406,451 | Borkenstein | Aug. 27, 1946 |